(12) United States Patent
Kuroda et al.

(10) Patent No.: US 6,512,543 B1
(45) Date of Patent: Jan. 28, 2003

(54) PHYSICAL QUANTITY DISTRIBUTION SENSOR, METHOD OF DRIVING SAID SENSOR AND METHOD OF PRODUCING SAID SENSOR

(75) Inventors: Takao Kuroda, Osaka (JP); Masayuki Masuyama, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/038,903

(22) Filed: Mar. 12, 1998

(30) Foreign Application Priority Data

Mar. 14, 1997 (JP) .............................. 9-060332

(51) Int. Cl.⁷ ................................ H04N 3/14
(52) U.S. Cl. .................. 348/302; 348/294; 348/303; 348/308
(58) Field of Search ................. 348/294, 301, 348/302, 303, 306, 307, 308, 311; 250/208.1; 257/231, 258, 291, 292

(56) References Cited

U.S. PATENT DOCUMENTS

| 4,301,477 A | 11/1981 | Takemoto et al. |
| 4,551,757 A | * 11/1985 | Ohkubo et al. ............. 348/302 |
| 4,556,908 A | * 12/1985 | Ida .............................. 348/302 |
| 5,051,831 A | * 9/1991 | Hashimoto .................. 348/302 |
| 5,122,881 A | * 6/1992 | Nishizawa et al. ......... 348/308 |
| 5,153,420 A | 10/1992 | Hack et al. |
| 5,335,008 A | * 8/1994 | Hamasaki .................... 348/301 |
| 5,771,070 A | 6/1998 | Ohzu et al. |
| 5,793,423 A | * 8/1998 | Hamasaki .................... 348/302 |
| 5,933,188 A | * 8/1999 | Shinohara et al. .......... 348/302 |

FOREIGN PATENT DOCUMENTS

| JP | 09247537 | 9/1997 |
| JP | 09247546 | 9/1997 |

* cited by examiner

Primary Examiner—Wendy R. Garber
Assistant Examiner—Luong Nguyen
(74) Attorney, Agent, or Firm—McDermott, Will & Emery

(57) ABSTRACT

A physical quantity distribution sensor is disclosed. The sensor comprises: a plurality of sensor/storage sections each having a sensor element for sensing a received physical quantity and a storage element for storing the information of physical quantity sensed by the sensor element; a selector for selecting at least one of the sensor/storage sections; and a plurality of buffers each capable of detecting and supplying the information stored in at least one selected sensor/storage section. This sensor further comprises at least one selection signal transfer line for transferring an output of the selector. Power supply input portions of the buffers are connected to the selection signal transfer line, and the buffers are operated using, as a power voltage, an output of the selector entered into the buffers through the selection signal transfer line.

7 Claims, 12 Drawing Sheets

PHYSICAL QUANTITY DISTRIBUTION SENSOR, METHOD OF DRIVING SAID SENSOR AND METHOD OF PRODUCING SAID SENSOR

BACKGROUND OF THE INVENTION

The present invention relates to a physical quantity distribution sensor, a method of driving said sensor and a method of producing said sensor.

Recently, there is increased a demand for a semiconductor device for sensing the spatial distribution of a physical quantity in a variety of fields. Particular attention is placed on a solid-state imaging device for sensing a light quantity as the physical quantity. More specifically, such a so-called amplifier-type solid-state imaging device is designed in the following manner. A plurality of storage sections are arranged to store a signal electric charge obtained through photo-electric conversion at the associated one of a plurality of photoelectric conversion sections. Each storage section is connected to the operation control portion of a transistor such as the gate of a field-effect transistor (FET) or the base of a bipolar transistor, or provision is made such that the storage section also serves as an operation control section. Accordingly, an electric current flowing in each transistor is controlled based on that potential of the associated storage section which varies with the amount of a signal electric charge.

With reference to FIG. 12, the following description will discuss the arrangement and operation of a physical quantity distribution sensor of prior art with an amplifier-type solid-state imaging device taken as an example.

As shown in FIG. 12, pixels 2 are arranged in a plurality of rows and a plurality of columns in an imaging region (generally, a region in which a physical quantity is to be sensed and stored) 1. Each pixel 2 comprises a photoelectric conversion/storage section 3 and a driving transistor 5 having a gate 4.

A selected-row-driving transistor 10 is disposed in each selected-row-driver 8, and a voltage is to be supplied to each selected-row-driving transistor 10 from a selected-row-driving-voltage input portion 9. Whether or not each selected-row-driving transistor 10 is electrically conductive, is controlled by a voltage of each output portion 7 of a shift register for row selection 6. An output of a selected-row-driving transistor 10 is connected to a plurality of row-select-transistors 12 arranged in the row through one of row selection lines 11, which allows a single pixel row to be selected out of the plurality of pixel rows.

The row-select-transistors 12 arranged in the same column are connected to a corresponding one of load transistors 14 through one of vertical signal lines 13. The output potential of each photoelectric conversion/storage section 3 varies with the amount of signal electric charge stored therein. The output potential of each photoelectric conversion/storage section 3 is given to the gate 4 of a corresponding driving transistor 5 which is connected to one of power supply lines 17. There is formed a source follower circuit in which the driving transistor 5 serves as a driving transistor and in which the load transistor 14 connected to a second power supply voltage (Vss) terminal 15 and to a gate input portion 16, serves-as a load transistor. A power supply voltage.(Vdd) is supplied to each power supply line 17 from a first power supply voltage (Vdd) terminal 27.

An output of the source follower circuit including the driving transistor 5 and the load transistor 14 is supplied to one of horizontal signal lines 24 through a signal column selection transistor 23 disposed in the associated one of column selection drivers 22. Whether or not signal column selection transistors 23 are electrically conductive, is controlled by voltages generated at output portions 21 of a shift register 20 for column selection. According to this control, a single pixel column is selected out of the plurality of pixel columns. An output of the source follower circuit in a selected column, is selectively sent to an impedance conversion section 25 through the horizontal signal line 24, and then supplied to an output portion 26 through the impedance conversion section 25.

After the signals are read out from all the pixels 2 arranged in the selected row, a reset voltage input portion 28 sends a reset voltage to the selected-row-reset-driving transistor 29 in the selected-row-driver 8 for the selected row, thereby to drive the pixel reset transistors 30 in the selected row through a pixel-reset-voltage-supply line 19 associated with the selected row. This resets the signal electric charges stored in the photoelectric conversion/storage sections 3 in the selected row. Then, these photoelectric conversion/storage sections 3 again start storing signal electric charges.

According to the above-mentioned arrangement of prior art, each pixel has a photoelectric conversion section and an electric charge storage section, or a photoelectric conversion/storage section 3 having both conversion and storage functions as in the above example, a row-select-transistor 12, a driving transistor 5 for amplifying an output of the photoelectric conversion/storage section 3, and a reset transistor 30 for resetting the electric charge stored in the electric charge storage section or the photoelectric conversion/storage section 3. Further, there are required a number of input/output lines such as the power supply lines 17 for driving transistors, the row-select-lines 11, the pixel-reset-voltage-supply lines 19, the vertical signal lines 13 and the like.

This complicates each pixel in arrangement and makes it difficult to enhance the performance thereof. It is also difficult to reduce each pixel in area to increase the number of pixels in the same area and to reduce the device in size.

In view of the foregoing, it is an object of the present invention to provide a physical quantity distribution sensor reduced in the number of input lines connected to pixels to simplify the pixels in arrangement, thus enabling to increase the number of pixels in the same area and to reduce the device in size.

SUMMARY OF THE INVENTION

The present invention provides a physical quantity distribution sensor comprising: a plurality of sensor/storage sections each having a sensor element for sensing a received physical quantity and a storage element for storing the information of physical quantity sensed by the sensor element; a selector for selecting at least one of the plurality of sensor/storage sections; and a plurality of buffers each capable of detecting and supplying the information stored in at least one selected sensor/storage section, and wherein there is disposed at least one selection signal transfer line for transferring an output of the selector, that power supply input portions of the buffers are connected to the selection signal transfer line, and that the buffers are operated using, as a power voltage, an output of the selector entered into the buffers through the selection signal transfer line.

The present invention provides another physical quantity distribution sensor having a plurality of unit cells arranged in N rows and M columns (each of N and M being a natural number not less than 2), each of the plurality of unit cells comprising (i) a sensor/storage section having (a) a sensor element for sensing a physical quantity and (b) a storage element for storing the information of physical quantity sensed by the sensor element, and (ii) a reset element for resetting the storage element, and this physical quantity distribution sensor is characterized in that there are disposed: a row selector for selecting one row out of the N rows; buffers in the M columns each for detecting and supplying the information stored in the storage element of the sensor/storage section in a selected row; and N selection signal transfer lines each for transferring an output signal of the row selector to each of the N rows, and that power supply input portions of the buffers in the M columns are connected to the N selection signal transfer lines and arranged to receive a power voltage through the selection signal transfer line in a selected row.

The present invention provides a further physical quantity distribution sensor comprising: sensor/storage sections each of which is disposed in each of a plurality of unit cells in a region to be sensed and stored and each of which comprises a sensor element for sensing a received physical quantity and a storage element for storing the information of sensed physical quantity; a plurality of buffers each of which is assigned to at least one sensor/storage section and each of which is arranged to detect and supply the information stored in the sensor element of the sensor/storage section; and a selector for selecting at least one sensor/storage section, and this physical quantity distribution sensor is characterized in that each of the plurality of buffers comprises an electric current control element for controlling the electric current flowing in each buffer, that an control input portion of each of the electric current control elements is connected to each of output portions of the selector, and that only the buffer assigned to the sensor/storage section selected by the selector is operated.

The present invention provides still another physical quantity distribution sensor having a plurality of unit cells arranged in N rows and M columns (N being a natural number not less than 1 and M being a natural number not less than 2), each of the plurality of unit cells comprising (i) a sensor/storage section having (a) a sensor element for sensing a physical quantity and (b) a storage element for storing the information of physical quantity sensed by the sensor element, and (ii) a reset element for resetting the storage element, and this physical quantity distribution sensor is characterized in that there are disposed: a column selector for selecting one column out of the M columns; and buffers in the M columns each for detecting and supplying the information stored in the storage element of at least one sensor/storage section in a selected column, and that output portions of the column selector are respectively connected to input portions of electric current control elements of the buffers.

The present invention provides a still further physical quantity distribution sensor having a plurality of unit cells arranged in N rows and M columns (N being a natural number not less than 1 and M being a natural number not less than 2), each of the plurality of unit cells comprising (i) a sensor/storage section having (a) a sensor element for sensing a physical quantity and (b) a storage element for storing the information of physical quantity sensed by the sensor element, and (ii) a reset element for resetting the storage element, and this physical quantity distribution sensor is characterized by comprising: a column selector for selecting one column out of the M columns; buffers in the M columns each for detecting and supplying the information stored in the storage element of at least one sensor/storage section in a selected column; a sensor output portion for externally supplying a signal supplied from the output portion of each of the buffers; an output signal transfer line connected to the sensor output portion directly or through an impedance conversion section; and switching elements arranged such that an electric current flows in the buffer in a column selected by the column selector.

The present invention provides a method of driving a physical quantity distribution sensor which comprises (i) sensor/storage sections each of which is disposed in each of a plurality of unit cells and each of which includes a sensor element for sensing a received physical quantity and a storage element for storing the information of physical quantity sensed by the sensor element, and (ii) buffers each for detecting and supplying the information stored in the storage element of at least one sensor/storage section, and in which at least one selection signal transfer line of a selector for selecting a portion of the plurality of unit cells, is electrically connected to power supply input portions of the buffers, and this driving method is characterized in that selection of a row to be read out is conducted by supplying a power voltage to the buffers of the row to be selected.

The present invention provides another method of driving a physical quantity distribution sensor which comprises (i) sensor/storage sections each of which is disposed in each of a plurality of unit cells and each of which includes a sensor element for sensing a received physical quantity and a storage element for storing the information of physical quantity sensed by the sensor element, and (ii) buffers each for detecting and supplying the information stored in the storage element of at least one sensor/storage section, and in which at least one selection signal transfer line of a first selector for selecting a portion of the plurality of unit cells, is electrically connected to power supply input portions of the buffers, and this driving method is characterized in that selection in the nth row to be read out is conducted simultaneously with selection of the (n−1)th row to be reset.

The present invention provides a further method of driving a physical quantity distribution sensor which comprises (i) sensor/storage sections each of which is disposed in each of a plurality of unit cells and each of which includes a sensor element for sensing a received physical quantity and a storage element for storing the information of physical quantity sensed by the sensor element, and (ii) buffers each for detecting and supplying the information stored in the storage element of at least one sensor/storage section, and in which output portions of a second selector for column selection are connected to input portions of electric current control means of the buffers, and this driving method is characterized in that column selection and control of an electric current flowing in the buffer in a selected column are conducted at the same timing.

The present invention provides still another method of driving a physical quantity distribution sensor which comprises (i) sensor/storage sections each of which is disposed in each of a plurality of unit cells and each of which includes a sensor element for sensing a received physical quantity and a storage element for storing the information of physical quantity sensed by the sensor element, and (ii) buffers each for sensing and supplying the information stored in the storage element of at least one sensor/storage section, and in which a first input portion of an electric current control means of the buffer in the mth column is connected to a column selector at its output portion for the (m−a)th column ($a \geq 1$), and in which a second input portion of the electric current control means of the buffer in the mth column is connected to the column selector at its output portion for the (m−b)th column (b≧1), and this driving method is characterized in that an electric current in the buffer in the mth column rises at the time when the (m−a)th column is selected, and falls at the time when the (m−b)th column is selected.

The present invention provides a method of producing a physical quantity distribution sensor having a plurality of unit cells arranged in N rows and M columns (each of N and M being a natural number not less than 2), each of the plurality of unit cells comprising (i) a sensor/storage section having (a) a sensor element for sensing a physical quantity and (b) a storage element for storing the information of physical quantity sensed by the sensor element, and (ii) a reset element for resetting the storage element, the physical quantity distribution sensor comprising: a row selector for selecting one row out of the N rows; buffers in the M columns each for detecting and supplying the information stored in the storage element of the sensor/storage section in a selected row; and N selection signal transfer lines each for transferring an output signal of the row selector to each of the N rows, power supply input portions of the buffers in the M columns being connected to the N selection signal transfer lines and arranged to receive a power voltage through the selection signal transfer line in a selected row, each of the buffers in the M columns having a source follower circuit comprising a plurality of driving elements assigned to the unit cells of each column and at least one load element connected to the driving elements, and this producing method is characterized by comprising: a step of forming the selection signal transfer lines; and a step of forming a wiring for connecting the driving elements to the load elements, these two steps forming two wirings different in level from each other.

DETAILED DESCRIPTION OF THE INVENTION

With reference to the accompanying drawings, the following description will discuss a physical quantity distribution sensor according to the present invention and a sensor driving method according to the present invention.

(First Embodiment)

Figure 1:
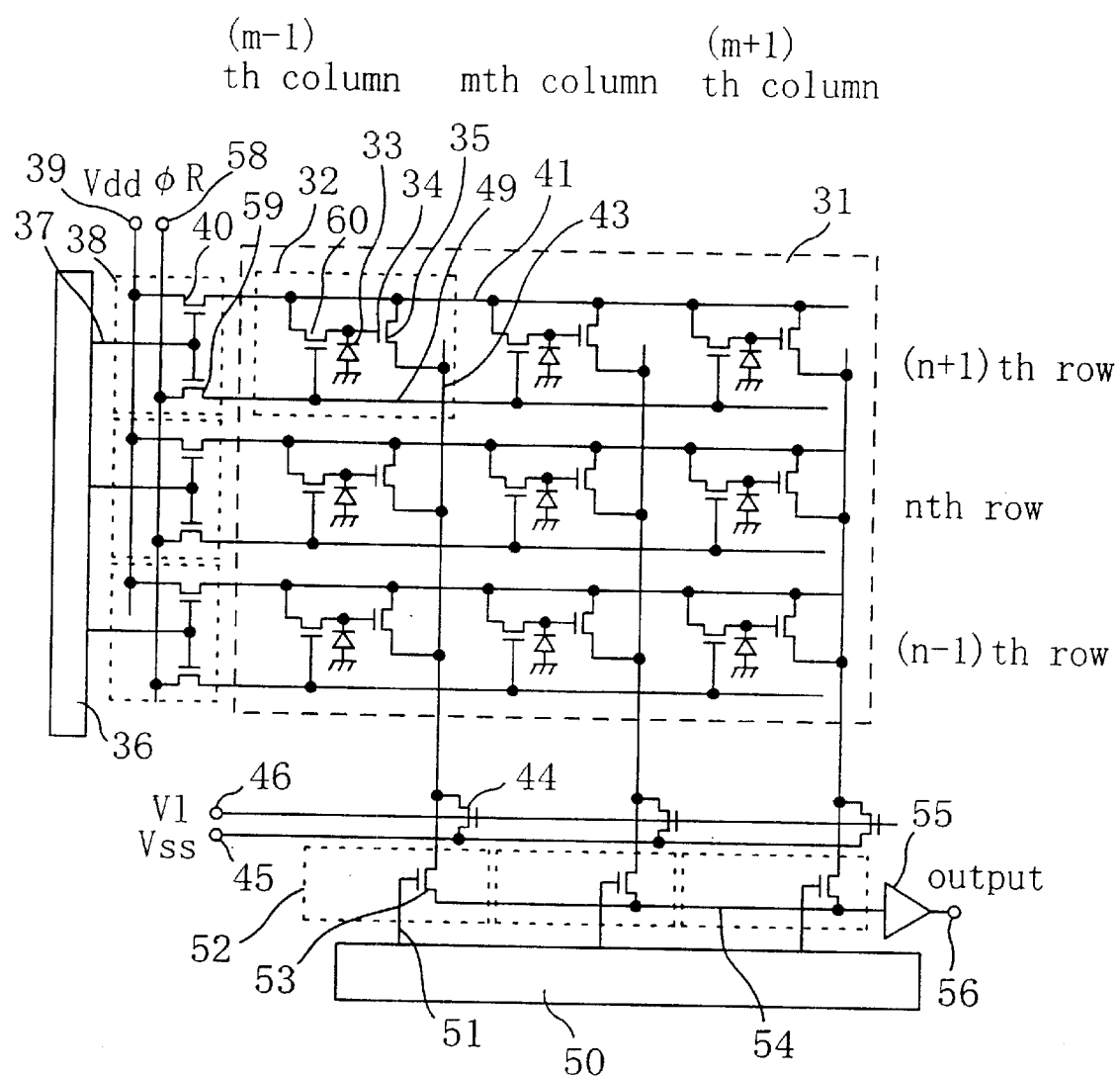
FIG. 1 is a view illustrating the arrangement of a physical quantity distribution sensor according to a first embodiment of the present invention.

FIG. 1 illustrates the arrangement of a physical quantity distribution sensor according to the first embodiment of the present invention. This sensor is a solid-state imaging device in which unit cells are two-dimensionally arranged.

In an imaging area (a region in which physical quantities are to be sensed and stored) 31, pixels 32 are arranged in a plurality of rows and a plurality of columns. FIG. 1 shows pixels 32 in the (n−1)th row, the nth row, the (n+1)th row, the (m−1)th column, the mth column and the (m+1)th column (in which each of n and m is a positive integer). Each pixel 32 has a photoelectric conversion/storage section 33, a driving transistor 35 having a gate 34, and a pixel reset transistor 60. The photoelectric conversion/storage section 33 serves as a photoelectric conversion element and also as a storage element.

A shift register 36 for row selection successively selects one row out of the plurality of rows through selected-row-drivers 38 each including a selected-row-driving transistor 40. An electrical potential at the output portion 37 assigned to a row to be selected is raised to allow the driving transistor 40 in the row to be selected. Thus, the shift register 36 controls the conductive/nonconductive state of each driving transistor 40. A first power supply voltage (Vdd) is applied to each driving transistor 40 from a selected-row-driving voltage input portion 39. Accordingly, when a selected one of the driving transistors 40 is made to be electrically conductive, the output of this selected driving transistor 40 is substantially equal to the power supply voltage (Vdd). The output of the selected transistor 40 is supplied to the driving transistors 35 arranged in the selected row through the associated one of a plurality of selected-row-power-supply lines 41. In other words, the first embodiment is designed such that the power voltage is supplied only to a selected one of the rows with no power voltage supplied to the other rows which are not being selected.

Power input portions of the driving transistors 35 in each row are connected to the associated one of the plurality of selected-row-power-supply lines 41. An output portion of each driving transistor 35- is connected to a corresponding load transistor 44 through the associated one of a plurality of vertical signal lines 43. Each load transistor 44 is connected to a second power supply voltage (Vss) terminal 45 and a gate input portion 46. The electrical potential at each photoelectric conversion/storage section 33 which varies with the signal electric charges stored therein determined the electrical potential at the gate 34 of the associated driving transistor 35. Each driving transistor 35 and the corresponding load transistor 44 form a source follower circuit. Each source follower circuit produces an output, in accordance with the signal electric charge of the associated photoelectric conversion/storage section 33, on the associated vertical signal line 43.

A shift register 50 for column selection is designed such that, the voltage of the output portion 51 assigned to a column to be selected is raised to allow the associated signal column selection transistor 53 in the column selection driver 52 to be electrically conductive. As a result, the electrical potential on the vertical signal line 43 in the selected column, i.e., the output from the source follower circuit in the selected column, is supplied to a horizontal signal line 54. This output is then transferred to a device output portion 56 through an impedance conversion section (output buffer) 55.

After the signals are read out from all the pixels in the selected row, the selected-row-reset-driving transistor 59 in the selected row becomes electrically conductive in response to a reset signal applied from a reset voltage input portion 58, thereby to supply a voltage to a selected one of a plurality of pixel-reset-voltage-supply lines 49. According to the voltage on the selected line 49, the pixel reset transistors 60 in the selected row becomes electrically conductive to clear the signal electric charges stored in the photoelectric conversion/storage sections 33 in the selected row. The photoelectric conversion/storage sections 33 again start storing signal electric charges.

According to the arrangement above-mentioned, an electric power is supplied, through each selected-row-power-supply line 41, to each source follower circuit formed of the driving transistors 35 and the corresponding load transistor 44. This eliminates interconnection lines such as the power supply lines 17 (FIG. 12) in the prior art, thus simplifying the sensor in circuit arrangement.

According to the first embodiment, the power supply voltage Vdd applied to the input portion 39, is used, without being lowered, as the power source of each source follower circuit. Accordingly, a so-called embedded transistor is preferably used as each selected-row-driving transistor 40. Further, a bootstrap circuit may also be used as each selected-row-driving transistor 40 with similar effects produced.

Figure 2:
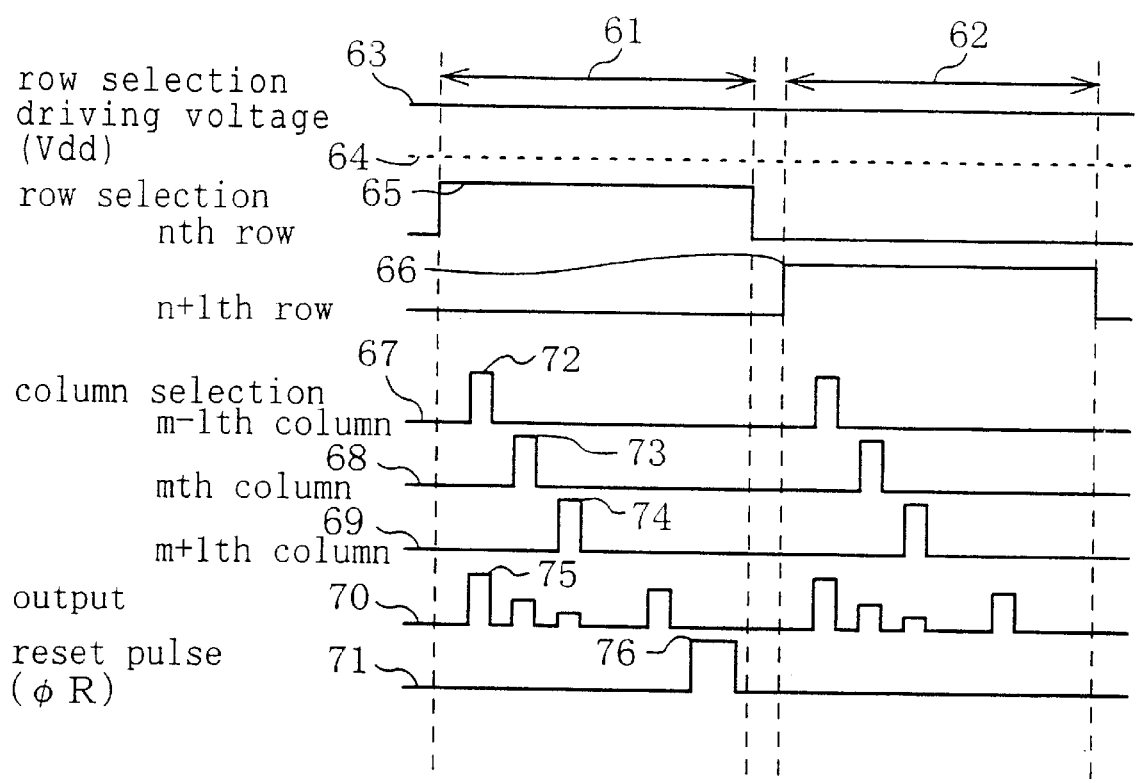
FIG. 2 is a timing chart illustrating a method of driving the physical quantity distribution sensor in FIG. 1.

With reference to FIGS. 1 and 2, the following description will discuss the operation of the sensor of the first embodiment.

FIG. 2 shows the waveforms of signals in a period 61 during which the nth row is being selected, and in a period 62 during which the (n+l)th row is being selected.

A row selection driving voltage 63 refers to the power supply voltage Vdd applied to the selected-row-driving-voltage input portion 39 in FIG. 1. The voltage reference point (0 Volt) of the row selection driving voltage 63 is generally designated by 64. In the period 61 during which the nth row is being selected, a row-select-voltage 65 supplied to the selected-row-power-supply line 41 in the nth row, becomes HIGH. In the period 62 during which the (n+1)th row is being selected, a row-select-voltage 66 supplied to the selected-row-power-supply line 41 in the (n+1)th row, becomes HIGH.

The following description will discuss in detail how the sensor is driven when the nth row is being selected.

In the shift register 36 for row selection, the output portion 37 assigned to the nth row supplies a row-select-signal to activate the selected-row-driving transistor 40 in the nth row. This electrically connects the selected-row-driving-voltage input portion 39 to the selected-row-power-supply line 41 in the nth row. Accordingly, in the period 61 during which the nth row is being selected, the row-select-voltage 65 supplied to the selected-row-power-supply line 41 in the nth row becomes HIGH. Therefore, the power supply voltage Vdd is supplied to the power supply input portions of the source follower circuits (serving as buffers) each formed of the driving transistor 35 in the nth row and the corresponding load transistor 44, such that the pieces of information stored in the photoelectric conversion/storage sections 33 in the nth row are read out. According to the pieces of information thus read, the vertical signal lines 43 each connecting the driving transistor 35 to the corresponding load transistor 44 are changed in electrical potential. The changes in electrical potential of the vertical signal lines 43 occur for all the columns substantially at the same time. The load transistor 44 functions as a constant current source of the source follower circuit including the load transistor 44 and it determines an electric current flowing in that source follower circuit.

In the shift register 50 for column selection, the voltages of the output portions 51 are raised, in the form of a pulse, from LOW to HIGH respectively for the columns to be successively selected. As shown in FIG. 2, a column selection voltage 67 for the (m−1)th column, a column selection voltage 68 for the mth column and a column selection voltage 69 for the (m+1)th column have column selection pulses 72, 73, 74, respectively. Accordingly, the outputs of the source follower circuits of the corresponding columns are transferred to the output buffer 55. Such transfer is achieved when the signal column selection transistors 53 in the respective columns are successively conducted. As a result, the outputs of the source follower circuits assigned to the (m−1)th column, the mth column and the (m+1)th column, respectively, are supplied as an output voltage 70 through the output buffer 55. The output from the nth-row/ (m−1)th-column pixel is generally designated by a reference numeral of 75.

After completion of the output from the pixels arranged in the nth row, a reset voltage 71 applied to the reset voltage input portion 58 is raised from LOW to HIGH in the form of a pulse to form a reset pulse 76. This causes all the pixel reset transistors 60 in the nth row to be conducted. The power supply portions of the pixel reset transistors 60 in the nth row are connected to the selected-row-power-supply line 41 in the nth row. Accordingly, when the pixel reset transistors 60 in the nth row are made to be conductive, the potential levels of the photoelectric conversion/storage sections 33 in the nth row are reset to the level of the power supply voltage. Thereafter, the (n+1)th row is selected and similar operations are then conducted.

In the first embodiment, the description has been made of the arrangement in which each photoelectric conversion/ storage section 33 serves as a photoelectric conversion element and also as a storage element for storing the output of the photoelectric conversion element. However, it is a matter of course that each photoelectric conversion/storage section 33 may comprise a photoelectric conversion element and a storage element for storing the output of the photoelectric conversion element. This is also applied to second to eighth embodiments discussed in the following.

(Second Embodiment)

Figure 3:
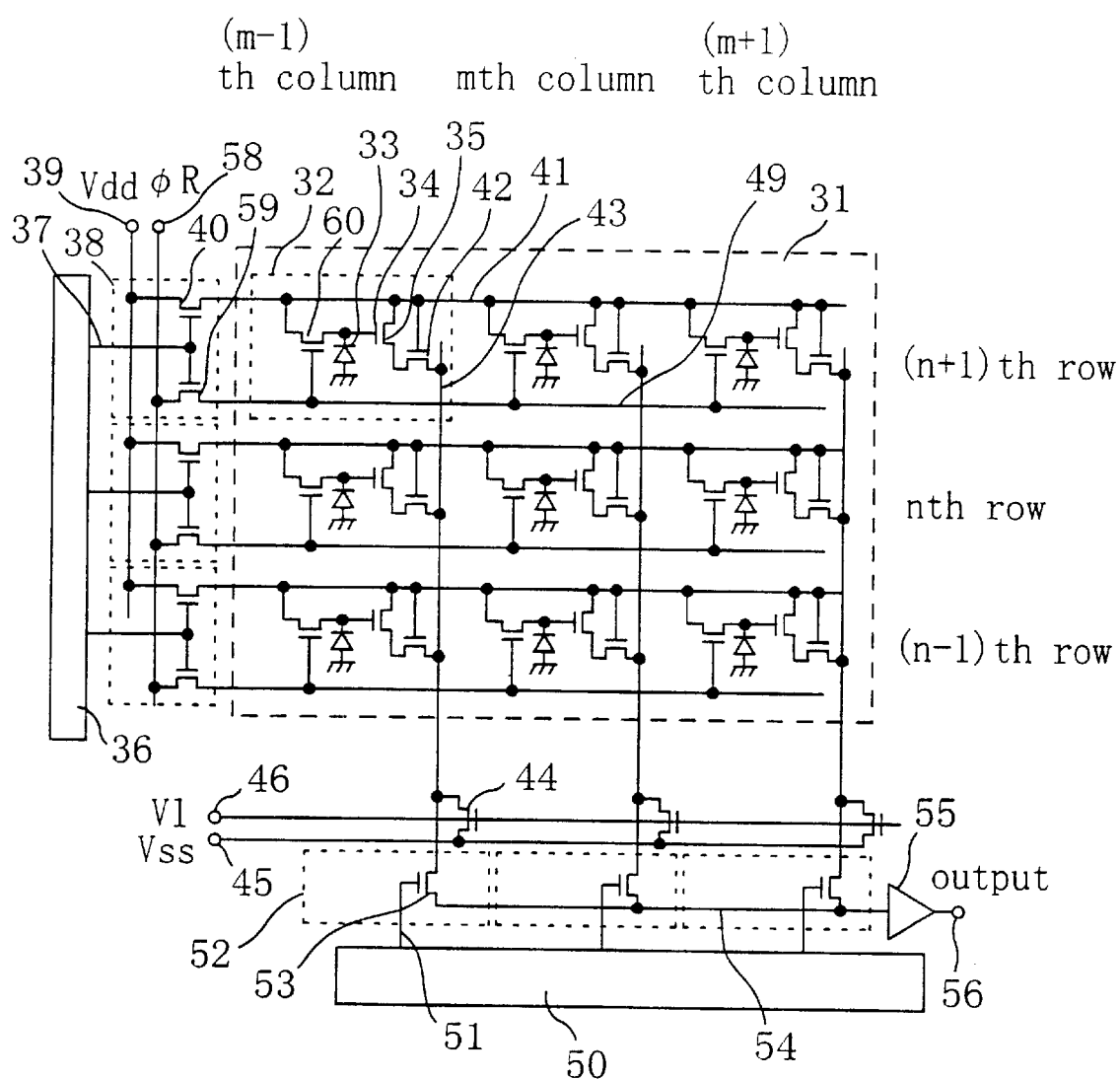
FIG. 3 is a view illustrating the arrangement of a physical quantity distribution sensor according to a second embodiment of the present invention.

FIG. 3 illustrates the circuit of a physical quantity distribution sensor according to the second embodiment of the present invention. In the following, there is omitted a description of those parts in the second embodiment which are similar in arrangement to parts in the first embodiment.

The sensor of the second embodiment differs from the sensor of the first embodiment in that each pixel further has a selected-row-transistor 42 disposed between the driving transistor 35 and the associated vertical signal line 43. Since the gate input portion of each selected-row-transistor 42 is connected to the associated selected-row-power-supply line 41, only the transistors 42 in a selected row are made electrically conductive.

According to the second embodiment, it is assured in a wide range of voltage that the selected one of the driving transistors 35 in a certain row is selectively connected to the associated vertical signal line 43. Thus, a wide range of operational voltage can be used.

The timings in a method of driving the sensor of the second embodiment are the same as those in the first embodiment.

(Third Embodiment)

Figure 4:
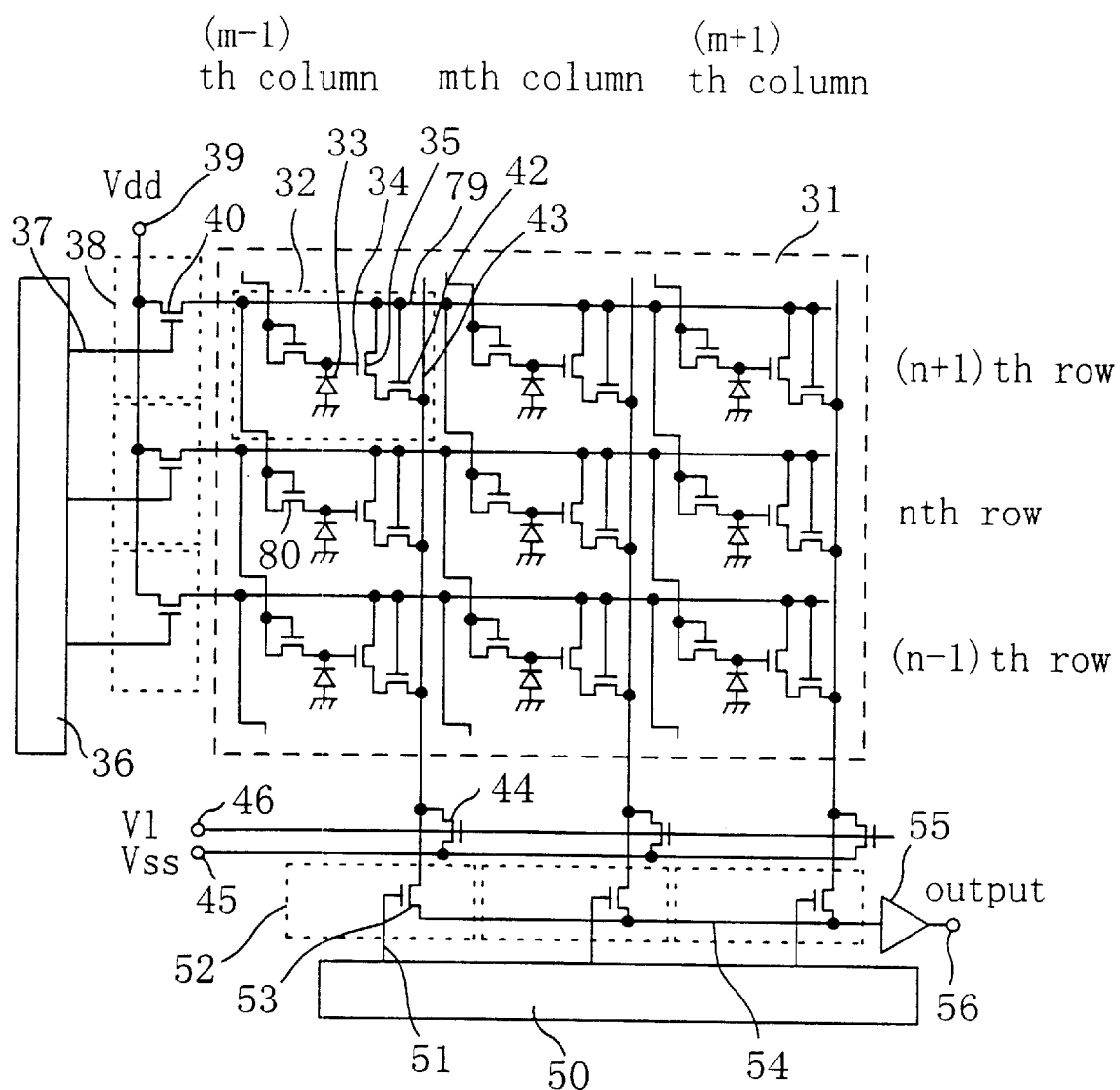
FIG. 4 is a view illustrating the arrangement of a physical quantity distribution sensor according to a third embodiment of the present invention.

FIG. 4 is a view illustrating the circuit of a physical quantity distribution sensor according to the third embodiment of the present invention. In the following, there is omitted a description of those parts in the third embodiment which are similar in arrangement to parts in the first embodiment.

The third embodiment differs from the first embodiment in the following points.

In the third embodiment, the selected-row-reset-driving transistors 59 and the pixel-reset-voltage-supply lines 49 in the first embodiment are not disposed, and the selected-row-power-supply line 79 in the nth row (n=2, 3, . . . N) is connected to input control portions of the pixel reset transistors 80 in the (n−1)th row. In other words, the selected-row-power-supply line 79 in the nth row (n=2, 3, . . . N) also serves as a pixel-reset-voltage-supply source for the (n−1)th row. Accordingly, the third embodiment is further simplified in circuit arrangement.

Figure 5:
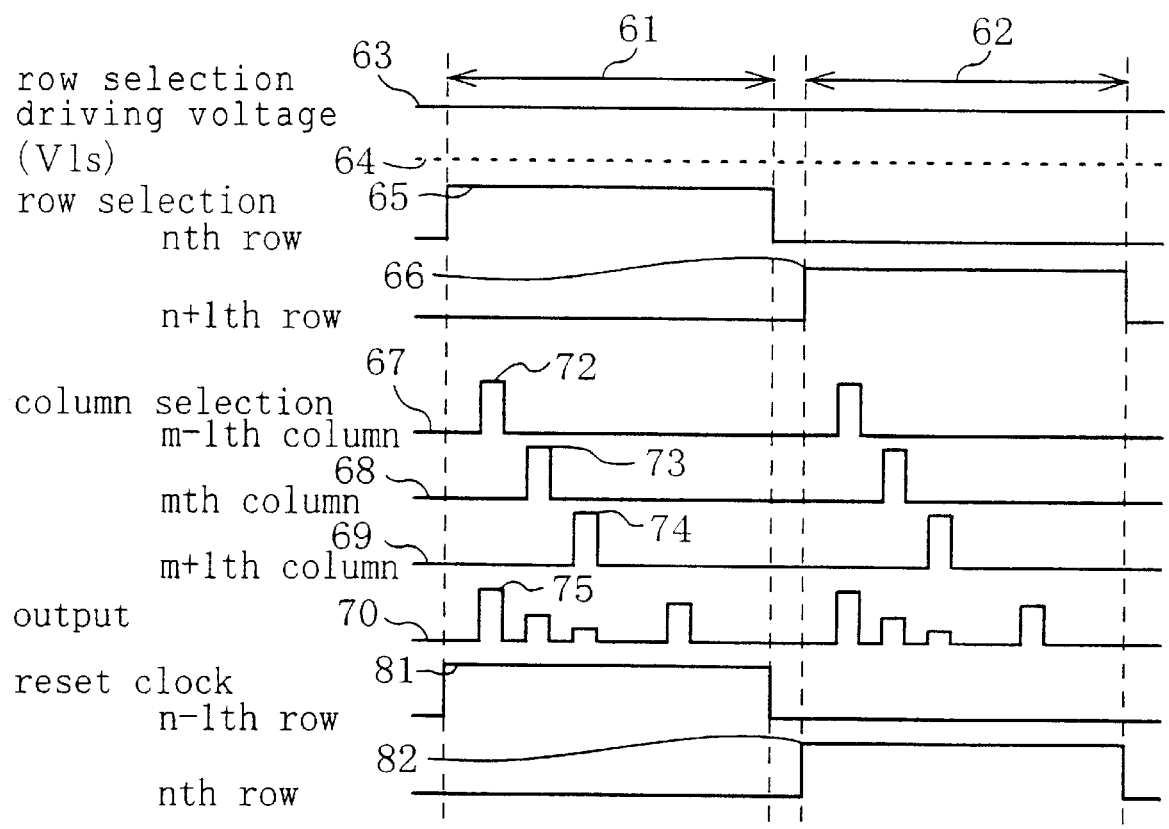
FIG. 5 is a timing chart illustrating a method of driving the physical quantity distribution sensor in FIG. 4.

With reference to FIG. 5, the following description will discuss the operation of the physical quantity distribution sensor of the third embodiment.

A row selection driving voltage 63 refers to the power supply voltage Vdd applied to the selected-row-driving-voltage input portion 39 in FIG. 4. The voltage reference point (0 Volt) of the row selection driving voltage 63 is generally designated by 64. In a period 61 during which the nth row is being selected, a row selection voltage 65 supplied to the selected-row-power-supply line 79 in the nth row, becomes HIGH. In a period 62 during which the (n+1)th row is being selected, a row-select-voltage 66 supplied to the selected-row-power-supply line 79 in the (n+1) th row, becomes HIGH.

In the shift register 36 for row selection, the output portion 37 in the nth row supplies a row-select-signal to activates the selected-row-driving transistor 40 in the nth row. This electrically connects the selected-row-driving voltage input portion 39 to the selected-row-power-supply line 79 in the nth row. Accordingly, in the period 61 during which the nth row is being selected, the row-select-voltage 65 on the selected-row-power-supply line 79 in the nth row becomes HIGH. Therefore, the power supply voltage Vdd is supplied to the power supply input portions of the source follower circuits. Further, there are conducted (i) the driving transistors 35 in the selected row and (ii) the selected-row-transistors 42 disposed between these driving transistors 35 and the corresponding vertical signal lines 43. This operates the source follower circuits (buffers) formed of the driving transistors 35 in the nth row and the corresponding load transistors 44, such that the pieces of information stored in the photoelectric conversion/storage sections 33 in the nth row are read out. According to the pieces of information thus read, the vertical signal lines 43 connecting the driving transistors 35 to the load transistors 44 are changed in potential. The changes in potential of the vertical signal lines 43 occur in all the columns substantially at the same time. The load transistor 44 of each column, functions as a constant electric current source for determining an electric current flowing in the source follower circuit of the column.

In the shift register 50 for column selection, the voltages of the output portions 51 are raised, in the form of a pulse, from LOW to HIGH respectively for the columns to be successively selected. As shown in FIG. 5, a column selection voltage 67 in the (m−1)th column, a column selection voltage 68 in the mth column and a column selection voltage 69 in the (m+1)th column have column selection pulses 72, 73, 74, respectively. Accordingly, the outputs of the source follower circuits (buffers) of the corresponding columns are transferred to the output buffer 55. Such transfer is achieved when the signal column selection transistors 53 in the respective columns are successively conducted. As a result, the outputs of the source follower circuits (buffers) assigned to the (m−1)th column, the mth column and the (m+1)th column, respectively, are supplied as an output voltage 70 through the output buffer 55. The output from the nth-row/(m−1)th-column pixel is generally designated by a reference numeral of 75.

After completion of the output from all the pixels in the nth row, the (n+1)th row is to be selected. When the (n+1)th row is selected, the pixel reset transistors 80 in the nth row are activated because the selected-row-power-supply line 79 in the (n+1)th row also serves as a pixel-reset-voltage-supply source in the nth row. This causes a reset operation for the nth row to be conducted in the period 62 during which the (n+1)th row is being selected.

The row-select-voltage 65 supplied to the selected-row-power-supply line 79 in the nth row, has a clock identical with a (n−1)th row reset clock 81 supplied to the input portions of the pixel reset transistors 80 in the (n−1)th row. The row-select-voltage 66 supplied to the selected-row-power-supply line 79 in the (n+1)th row has a clock identical with an nth row reset clock 82 supplied to the input portions of the pixel reset transistors 80 in the nth row.

(Fourth Embodiment)

Figure 6:
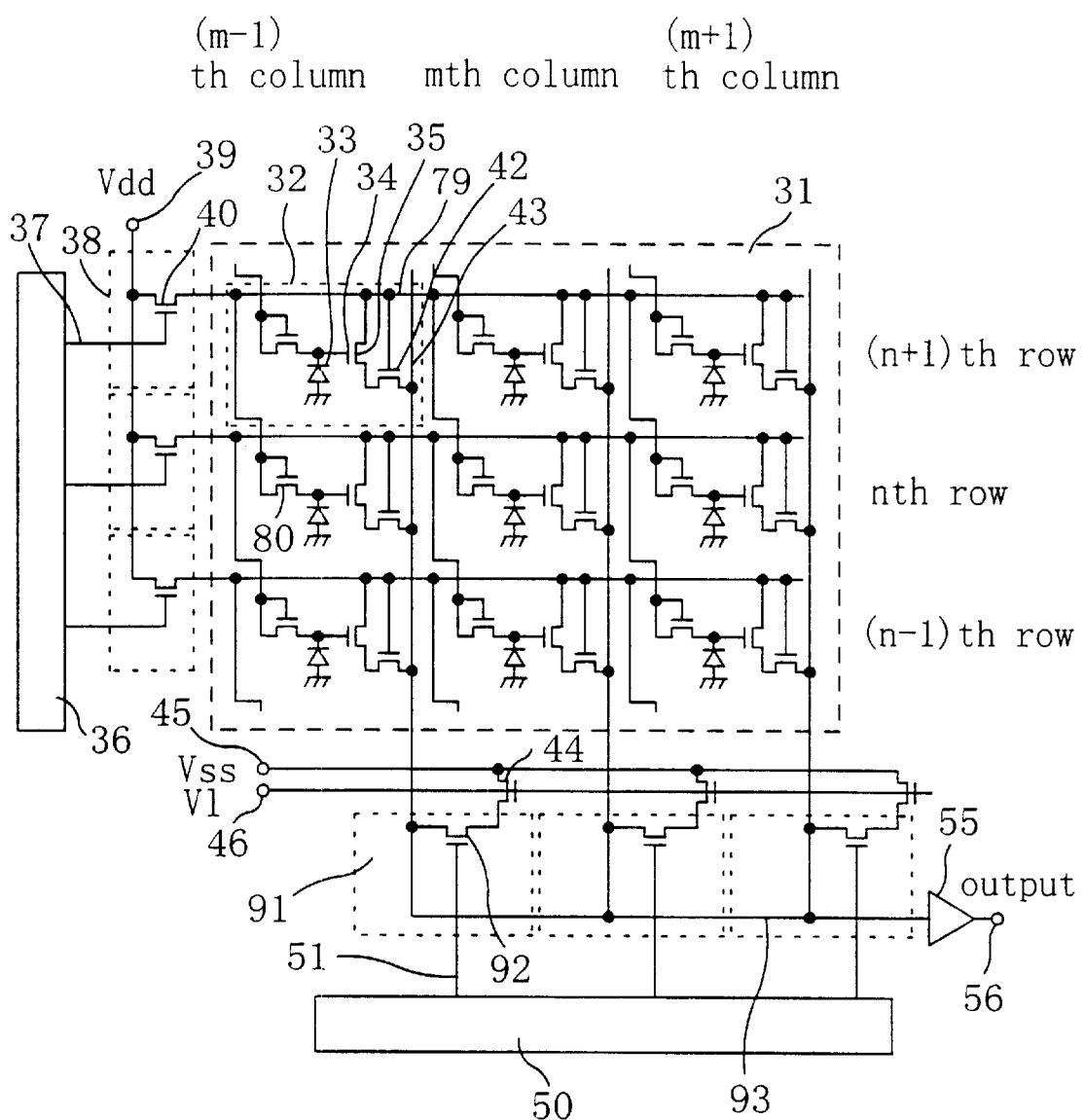
FIG. 6 is a view illustrating the arrangement of a physical quantity distribution sensor according to a fourth embodiment of the present invention.

FIG. 6 is a view illustrating the circuit of a physical quantity distribution sensor according to the fourth embodiment of the present invention. In the following, there is omitted a description of those parts in the fourth embodiment which are similar in arrangement to parts in the third embodiment.

The fourth embodiment differs from the third embodiment in that the column selection transistor 92 in each column selection driver 91 also serves as an electric current switch of the source follower circuit in a selected column.

Each of the first to third embodiments of the present invention and the prior art, is arranged such that, in a period during which a row is being selected, an electric current flows in the source follower circuits (buffers) of all the columns. A solid-state imaging device as an example generally has hundreds or thousands of columns. This results in enormous power consumption. However, the fourth embodiment is designed such that an electric current flows only in the source follower circuit in a selected column. This reduces the power consumption to the order of about one over hundreds to about one over thousands. Particularly, each of the first to third embodiments is arranged such that the electric currents in all the source follower circuits in the same row are supplied through the selected-row-power-supply line 41, 79. Accordingly, when the current capacity of each power supply line 41, 79 is small, there is a possibility of each source follower circuit not operating normally due to voltage drop. According to the fourth embodiment, an electric current selectively flows only in the source follower circuit in a selected column. Thus, the problem above-mentioned can be solved.

(Fifth Embodiment)

Figure 7:
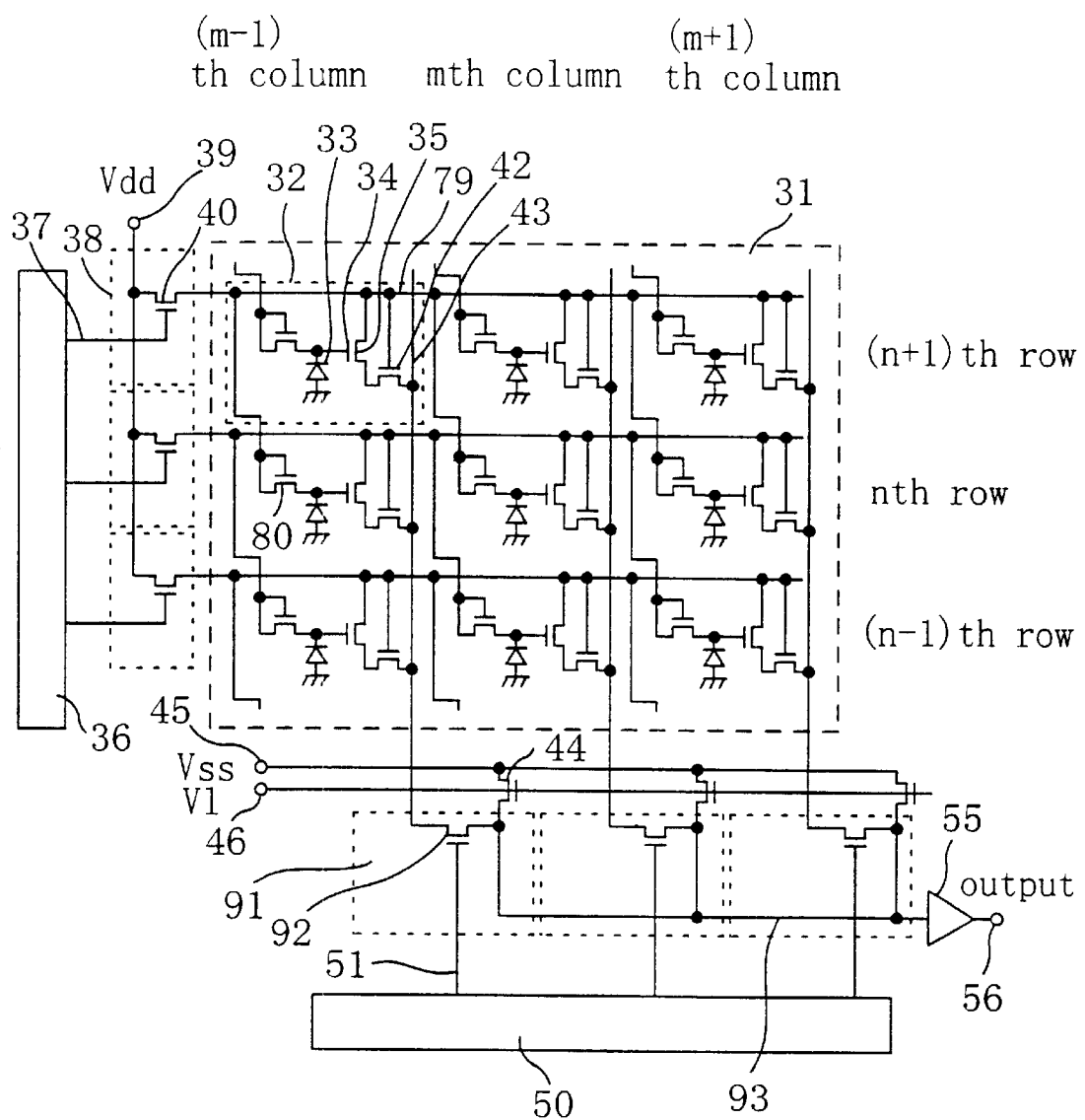
FIG. 7 is a view illustrating the arrangement of a physical quantity distribution sensor according to a fifth embodiment of the present invention.

FIG. 7 is a view illustrating the arrangement of a physical quantity distribution sensor according to the fifth embodiment of the present invention. In the following, there is omitted a description of those parts in the fifth embodiment which are similar in arrangement to parts in the fourth embodiment.

The fifth embodiment differs from the fourth embodiment in that the output of each source follower circuit is connected to a corresponding horizontal signal line 93 through a column selection transistor 92. According to the fourth embodiment, all the vertical signal lines 43 are always connected to one another. It is therefore required that when a selected column is changed, the source follower circuit in the newly selected column electrically charges all of the vertical signal lines 43. Accordingly, the time constant of each source follower circuit is required to be small to bring each source follower circuit into a steady state as early as possible. To this end, the driving transistor 35 in each pixel 32 must be increased in size. In view of the miniaturization of the sensor, however, restrictions are imposed to the sizes of each driving transistor 35.

According to the fifth embodiment, the output portion of the source follower circuit in a selected column is not connected to the vertical signal lines 43 in other columns. Thus, the capacitance to be electrically charged by one source follower circuit is reduced to the order of one over hundreds to one over thousands as compared with the fourth embodiment. This hardly causes trouble of lengthening the electrically charging time. According to the fifth embodiment, the load transistors 44 respectively assigned to the columns may be replaced with a single common load transistor.

(Sixth Embodiment)

Figure 8:
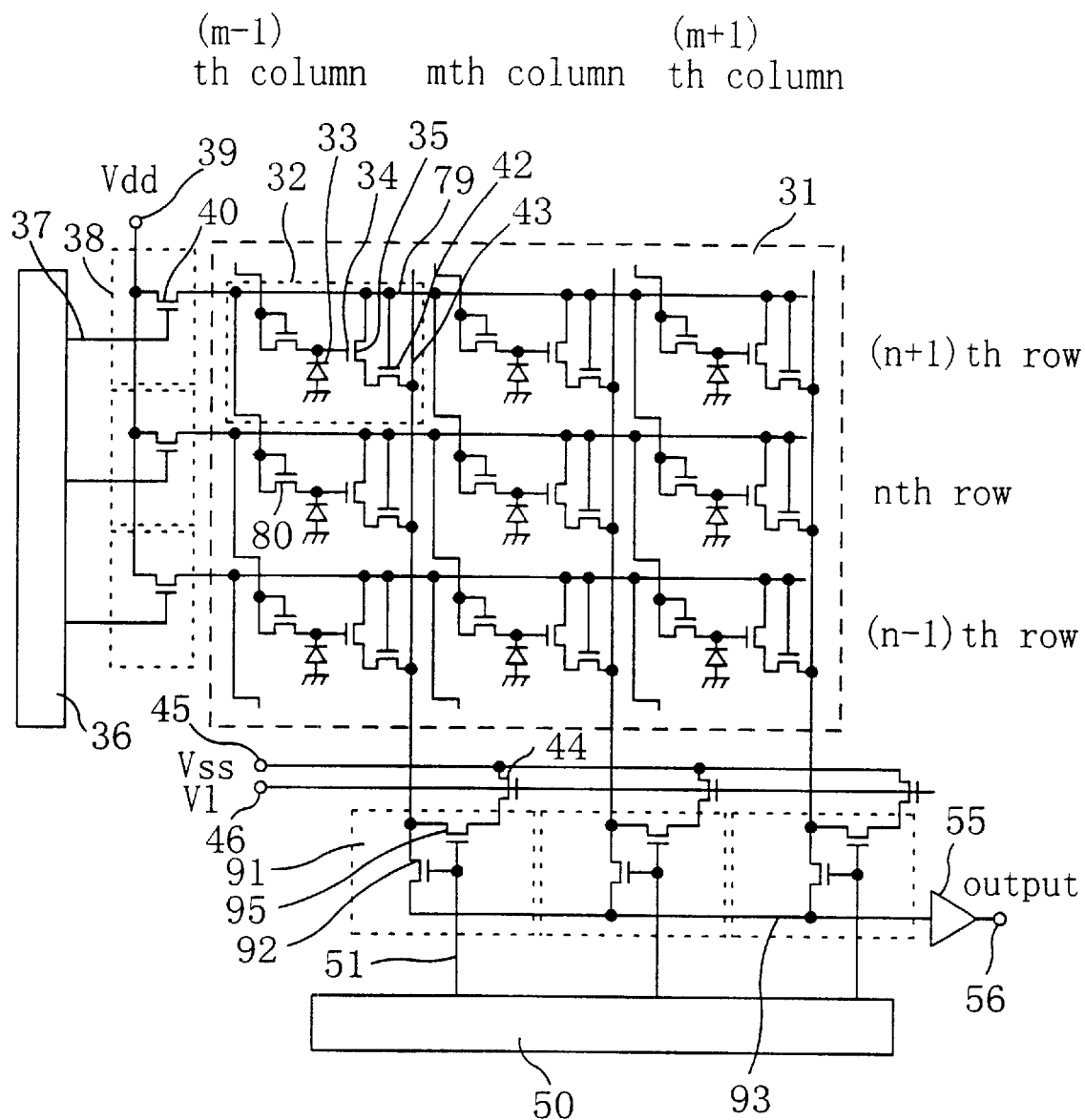
FIG. 8 is a view illustrating the arrangement of a physical quantity distribution sensor according to a sixth embodiment of the present invention.

FIG. 8 illustrates the circuit arrangement of a physical quantity distribution sensor according to the sixth embodiment of the present invention. In the following, there is omitted a description of those parts in the sixth embodiment which are similar in arrangement to parts in the fourth embodiment.

The sixth embodiment differs from each of the fourth and fifth embodiments in the following points (a), (b) and (c).

(a) In each pixel, an electric current control column selection transistor 95 is disposed independently from the column selection transistor 92.

(b) The gate of each electric current control column selection transistor 95 is connected to the corresponding output portion 51 of the shift register 50 for column selection.

(c) Each vertical signal line 43 is connected to the horizontal signal line 93 through the associated column selection transistor 92.

With the arrangement above-mentioned, an electric current flows only in the source follower circuit in a selected column. Further, only the vertical signal line 43 for a selected column is connected to the horizontal signal line 93, and only the load transistor 44 in the selected column functions as the load transistor of the source follower circuit.

(Seventh Embodiment)

Figure 9:
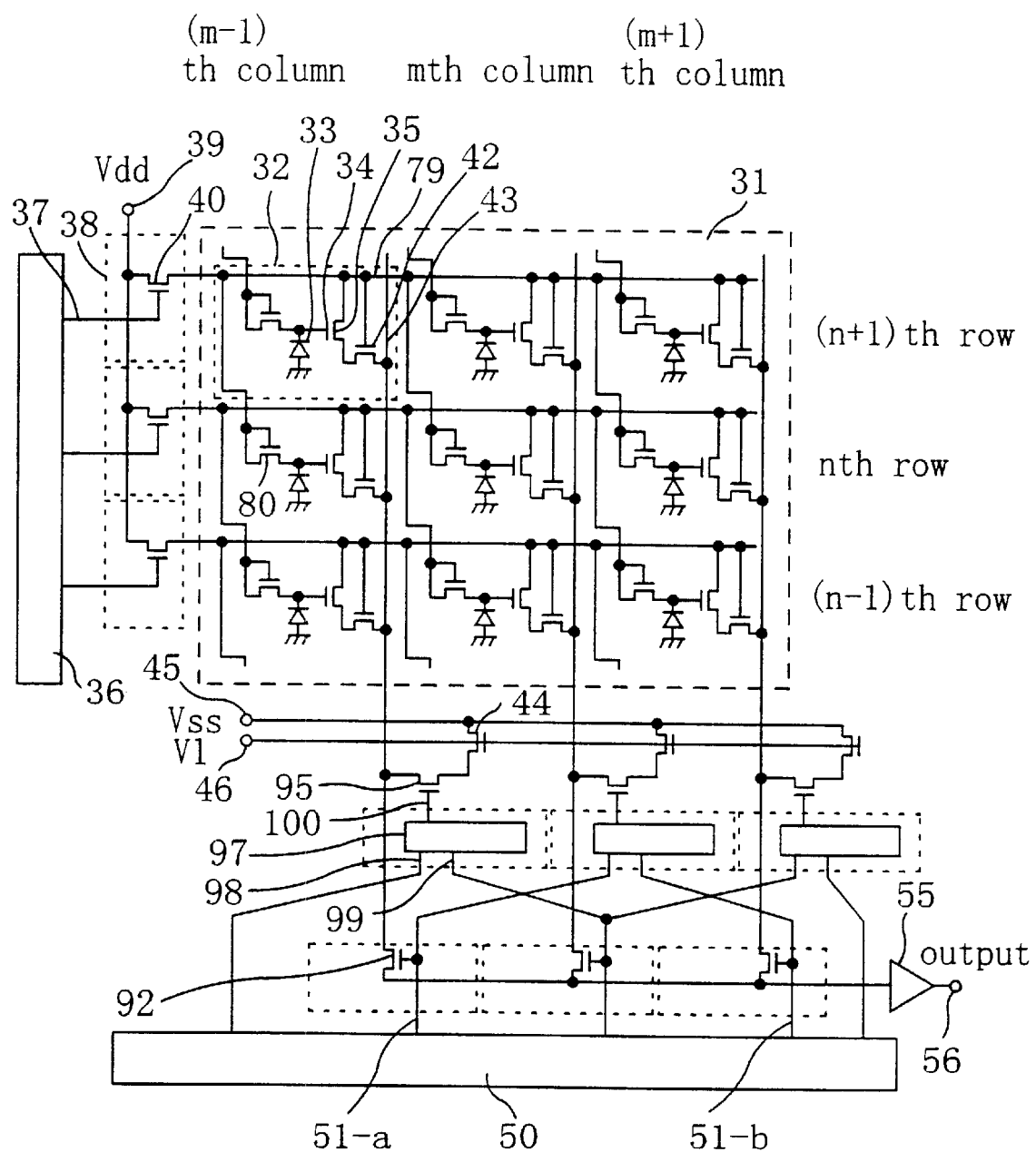
FIG. 9 is a view illustrating the arrangement of a physical quantity distribution sensor according to a seventh embodiment of the present invention.

FIG. 9 illustrates the circuit arrangement of a physical quantity distribution sensor according to the seventh embodiment of the present invention. In the following, there is omitted a description of those parts in the seventh embodiment which are similar in arrangement to parts in the sixth embodiment.

According to each of the fourth to sixth embodiments, each column selection period for signal reading is equal to each column selection period for letting flow an electric current in each source follower circuit. This causes no inconvenience when a time constant during which the output of each source follower circuit is brought into a steady state from the time an electric current starts flowing therein, is sufficiently small as compared with a period during which a signal in a selected column is supplied. However, there are instances where the electric current driving ability of each driving transistor 35 cannot sufficiently be increased in view of size or the like, or where capacitance of each vertical signal line 43 is not large due to a large number of pixels arranged in the vertical direction. In such instances, each period during which an electric current flows in each source follower circuit, is required to be longer than each signal output period.

The seventh embodiment is designed such that a time period during which an electric current flows in a certain source follower circuit can be determined independently from the signal output period. More specifically, a voltage generating circuit section 97 is disposed in each column. Each voltage generating circuit section 97 comprises a first input portion 98, a second input portion 99 and an output portion 100, and is arranged to supply a predetermined potential to the output portion 100 in a period between the time when the first input portion 98 receives a predetermined signal and the time when the second input portion 99 receives a predetermined signal.

The following description will discuss the voltage generating circuit section 97 for the source follower circuit in the mth column. The first input portion 98 of the voltage generating circuit section 97 is connected to an output portion for the (m−1)th column 51-a of the shift register for column selection 50. The second input portion 99 of the voltage generating circuit section 97 is connected to an output portion for the (m+1)th column 51-b of the shift register for column selection 50. The voltage output portion 100 in the mth column is connected to the gate of the electric current control column selection transistor 95 in the mth column.

When the (m−1)th column is selected by the shift register 50, the voltage generating circuit section 97 in the mth column receives an output from the output portion for the (m−1)th column 51-a of the shift register 50 through the first input portion 98. Then, the voltage generating circuit section 97 increases the potential of the output portion 100 in the mth column from LOW to HIGH, and maintains the potential thus increased. Accordingly, before the mth column a is actually selected, an electric current starts flowing in the source follower circuit in the mth column, thus starting a data reading operation. Thereafter, when the (m+1)th column is selected by the shift register for column selection 50, the voltage generating circuit section 97 in the mth column receives, through the second input portion 99, an output from the output portion for the (m+1)th column 51-b of the shift register for column selection 50, and then stops operating. More specifically, the output portion 100 in the mth column is lowered in potential from HIGH to LOW to finish the reading operation using the source follower circuit in the mth column.

(Eighth Embodiment)

Figure 10:
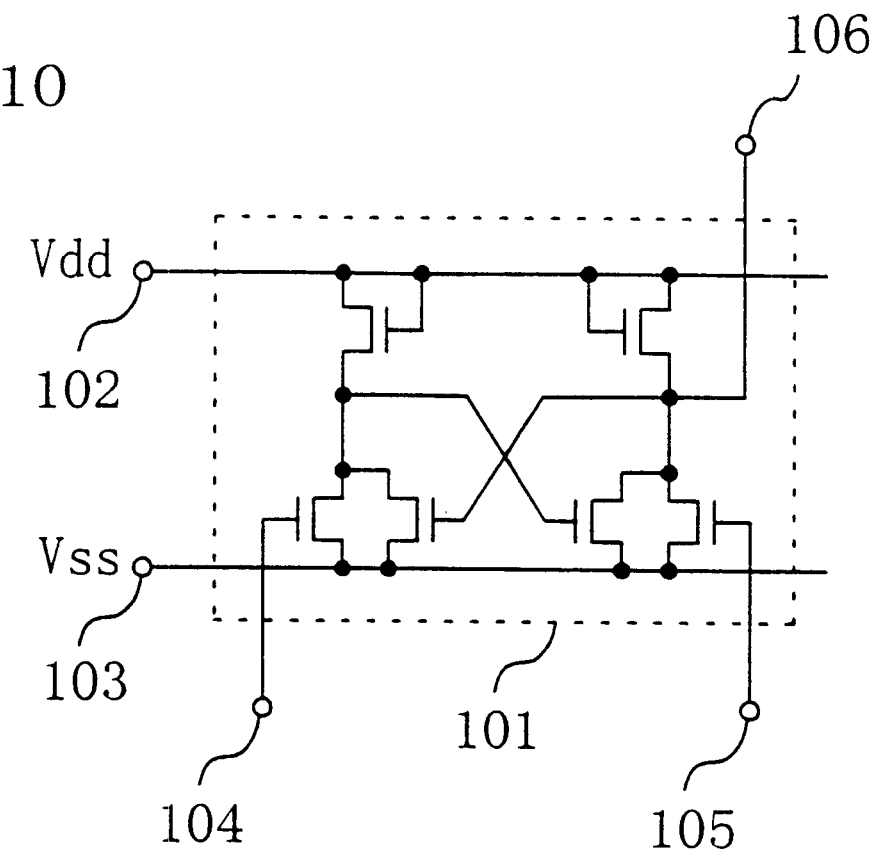
FIG. 10 is a view illustrating the arrangement of a physical quantity distribution sensor according to an eighth embodiment of the present invention.

FIG. 10 is a view illustrating the arrangement of a main portion of a physical quantity distribution sensor according to the eighth embodiment of the present invention. Basically, the eighth embodiment has an arrangement similar to that of the seventh embodiment, but is different therefrom in the voltage generating circuit section. In the following, there is omitted a description of those parts in the eighth embodiment which are similar in arrangement to parts in the seventh embodiment.

A voltage generating circuit section 101 in FIG. 10 corresponds to an electric current control selection voltage generating circuit section 97 in FIG. 9, and is a circuit having a known arrangement which is called a static RS flip-flop circuit or a bistable unit.

The circuit section 101 has a first power supply input portion (Vdd) 102, a second power supply input portion (Vss) 103, a first input portion 104, a second input portion 105 and an output portion 106. Inside of the circuit section 101, six transistors are mutually connected as shown in FIG. 10. The first input portion 104, the second input portion 105 and the output portion 106 respectively correspond to the first input portion 98, the second input portion 99 and the electric current control selection voltage output portion 100 of each electric current control selection voltage generating circuit section 97 in FIG. 9.

This circuit section 101 is a so-called bistable circuit and is operated such that the output portion 106 is brought into a first power voltage state by a positive pulse given to the first input portion 104 and that the output portion 106 is brought into a second power voltage state by a positive pulse given to the second input portion 105.

Figure 11:
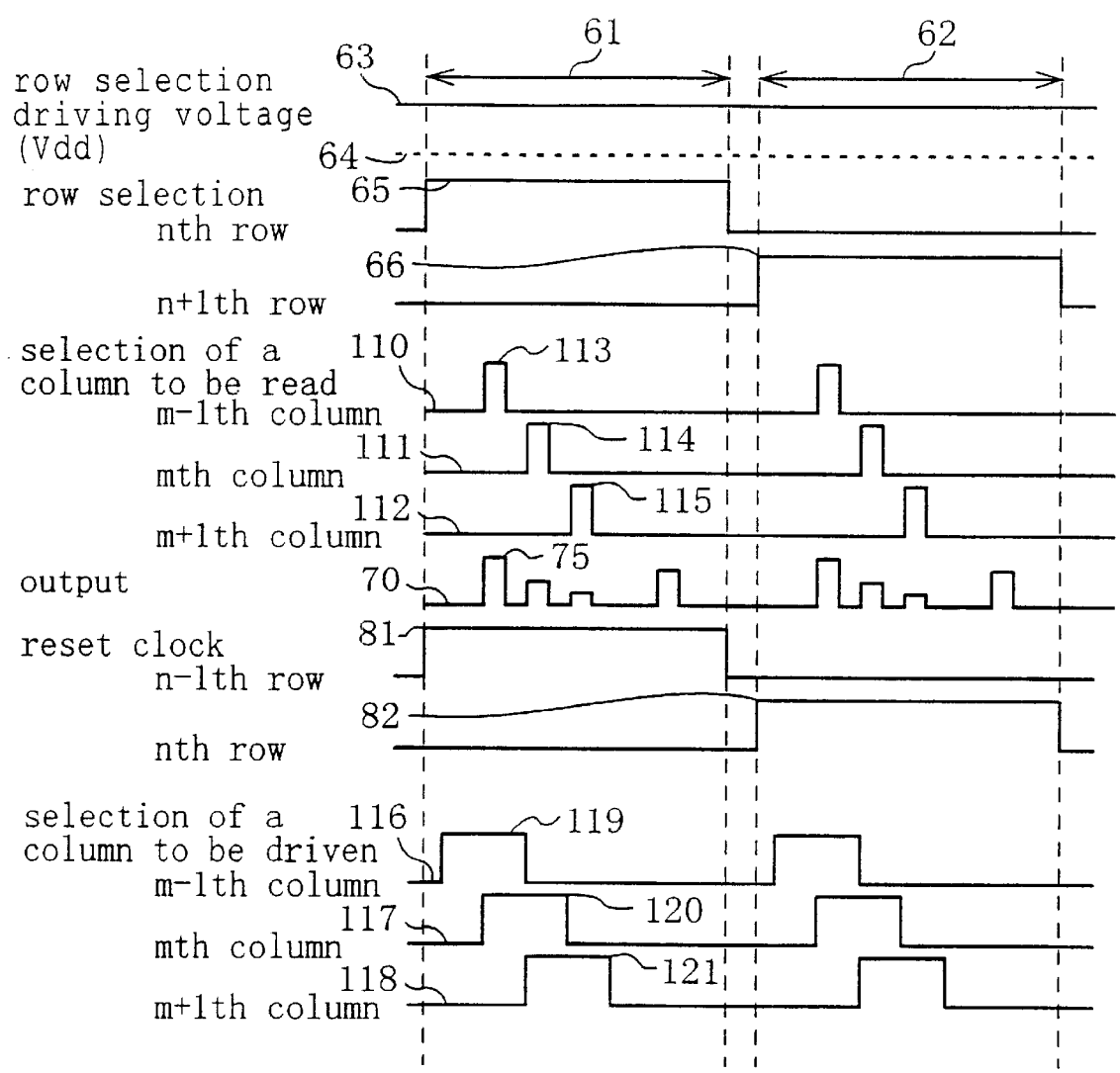
FIG. 11 is a timing chart illustrating a method of driving the physical quantity distribution sensor in each of FIGS. 9 and 10.

With reference to FIG. 11, the following description will discuss a method of driving the sensor according to the eighth embodiment.

In FIG. 11, column selection voltages 110, 111, 112 for the (m−1)th column, the mth column, the (m+1)th column are voltages of the output portions 51 of the shift register for column selection 50. Column selection pulses 113, 114, 115 respectively show the selection states of the (m−1)th column, the mth column, the (m+1)th column. Electric current control column selection voltages 116, 117, 118 for the (m−1)th column, the mth column, the (m+1)th column, are voltages of the output portions 106 of the electric current control selection voltage generating circuit sections 101 for the (m−1)th column, the mth column, the (m+1)th column. Electric current control column selection pulses 119, 120, 121 respectively show the electric current control selection states of the (m−1)th column, the mth column, the (m+1)th column.

In the following description, the electric current control column selection pulse 120 for the mth column is taken as an example. The pulse 120 is brought into the first power supply voltage state at the rising of the (m−1)th column selection pulse 113, and is brought into the second power voltage state at the rising of the (m+1)th column selection pulse 115. More specifically, an electric current starts flowing in the source follower circuit in the mth column before the mth column is selected as a column to be supplied, and the flow of an electric current in the source follower circuit in the mth column is stopped after the output in the mth column has been finished.

According to the eighth embodiment, the wirings are installed such that the pulse 120 for the mth column rises at the rising of the (m−1)th column selection pulse 113, and falls at the rising of the (m+1)th column selection pulse 115. However, it is a matter of course that provision may be made such that the pulse 120 rises at the rising of a further preceding column selection pulse. With such an arrangement, an electric current can flow in the source follower circuit earlier. As to the falling of the pulse 120, too, it is possible to set, as necessary, such that the pulse 120 falls later than the rising of the pulse 115.

A so-called bistable unit is shown in FIG. 10, as a specific example of the voltage generating circuit section for the electric current control section. However, the circuit section is not limited to such a circuit arrangement, but a CMOS circuit of such a bistable unit or other logic circuit may also be used. As an example, there is shown a circuit of which output rises or falls at the rising of a clock applied to an input portion thereof. However, there may also be used a circuit of which output rises or falls at the falling of a clock applied to an input portion thereof.

In the foregoing, the description has been made of each of the fourth to eighth embodiments having the arrangement of pixels and row selection portions identical with that of the third embodiment. However, each of the fourth to eighth embodiments may have an arrangement of pixels and row selection portions identical with that of each of the first to third embodiments, or identical with that of prior art.

Figure 12:
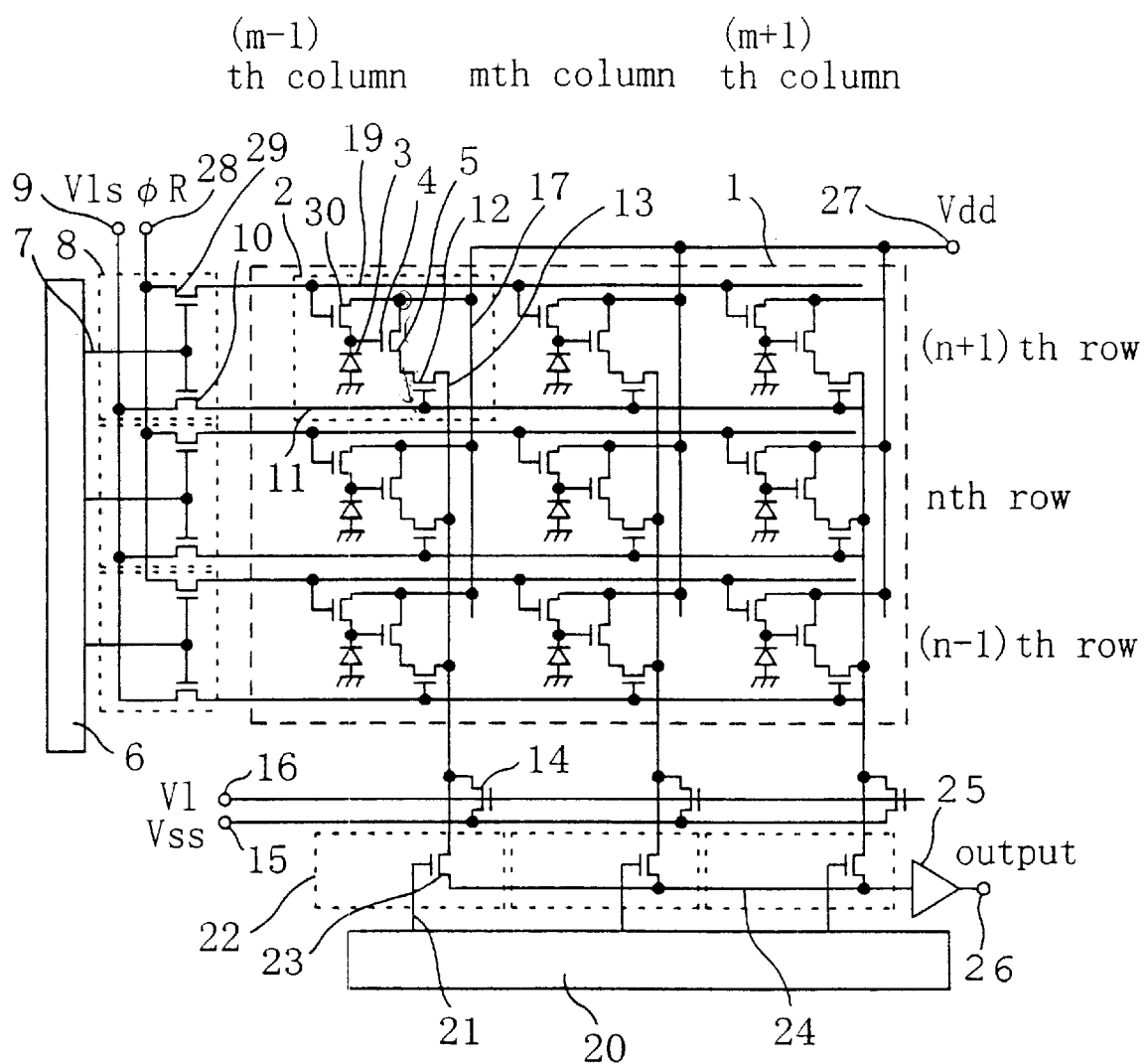
FIG. 12 is a view illustrating a physical quantity distribution sensor of prior art.

In the arrangement of prior art in FIG. 12, it is only the vertical signal lines 13 and the power supply lines 17 that are required to be of low resistance (large electric current capacity). In the pixels 2 severely limited in view of designing, these lines 13, 17 can be disposed in parallel to each other and can be formed in the same wiring layer (for example, metallic layer) of low resistance. In each of the embodiments of the present invention shown in FIGS. 1 to 11, however, it is the selected-row-power-supply lines 41 and the vertical signal lines 43 that are required to be of low resistance (large electric current capacitance). As shown in FIG. 1, these liens 41, 43 are not parallel to each other, but are at right angles to each other. To achieve each embodiment of the present invention, it is much easier to form these lines 41, 43 by wiring layers different in level from each other, than to form these lines 41, 43 by the same wiring layer.

In each of the embodiments above-mentioned, the description has been made, for simplification, of the arrangement having photoelectric conversion/storage sections serving as photoelectric conversion elements and also as signal electric charge storage elements. However, it is a matter of course that the present invention may be arranged such that photoelectric conversion elements and signal electric charge storage elements are independently disposed.

In the foregoing, the description has been made of the arrangement in which each output is supplied through the output buffer. However, it is apparent that the output buffer is not an indispensable element of the present invention.

Further, the foregoing description has been made with a solid-state imaging device taken as an example. However, when the sensor is equipped with sensor elements for sensing the physical quantity of x-rays, infrared rays, temperature, a magnetic field, an electric field, pressure or the like, and when provision is made such that the potential of each sensor elements changed due to received physical quantity, is transferred to the gate of each driving transistor, it is a matter of course that the present invention is also effective for a general physical quantity distribution sensor for other substance than light.

Further, the foregoing description has been made of the arrangement in which the unit cells are two-dimensionally arranged. However, the present invention is effective for the arrangement in which the unit cells are one-dimensionally arranged.

In each of the embodiments above-mentioned, a shift register is used for each of row and column selectors. However, a decoder may be used, instead of such a shift register, with similar effects produced.

According to the present invention, the lines each interconnecting a row of pixels have a row selection function, a power voltage supply function and a reset function, thus achieving a physical quantity distribution sensor simple in arrangement.

What is claimed is:

1. A physical quantity distribution sensor having a plurality of unit cells arranged in N rows and M columns (each of N and M being a natural number not less than 2), each of said plurality of unit cells comprising (i) a sensor/storage section for sensing and storing information of a physical quantity, and (ii) a reset element for resetting said sensor/storage section, wherein said sensor comprises:
- a row selector for selecting one row out of said N rows;
- buffers in said M columns each for detecting and supplying information stored in the sensor/storage section in a selected row; and
- N selection signal transfer lines each for transferring an output signal of said row selector to each of said N rows,
- power supply input portions of said buffers in said M columns being connected to said N selection signal transfer lines, and arranged to receive a power voltage through the selection signal transfer line in a selected row, and
- the selection signal transfer line in the nth row (n=2, 3, . . . N) being connected to input portions of the reset elements in the (n−1)th row.

2. The physical quantity distribution sensor of claim 1, wherein each of said buffers in said M columns has a source follower circuit comprising (i) a drive element and (ii) at least one load element connected to said drive element.

3. The physical quantity distribution sensor of claim 2, wherein each of said plurality of unit cells further comprises a switching element for controlling the electric connection/disconnection between the-drive element and load element,
- control input portions of the switching elements in each row being connected to the selection signal transfer line in each row.

4. A physical quantity distribution sensor having a plurality of unit cells arranged in N rows and M columns (N being a natural number not less than 1 and M being a natural number not less than 2), each of said plurality of unit cells comprising a sensor/storage section for sensing and storing information of a physical quantity, wherein said sensor comprises:
- a column selector for selecting one column out of said M columns; and
- buffers in said M columns each for detecting and supplying the information stored in the sensor/storage section in a selected column,
- each of said buffers in said M columns comprising an electric current control circuit having a first input portion and a second input portion for operating each of said buffers between the time when said first input portion receives a predetermined signal and the time when said second input portion receives a predetermined signal, and
- the first input portion of the electric current control circuit of the buffer in the mth column being connected to said column selector at its output portion for the (m−a)th column (a≧1), and the second input portion of said electric current control circuit of said buffer in the mth column being connected to said column selector at its output portion for the (m+b)th column (b≧1).

5. The physical quantity distribution sensor of claim 4, wherein each of said electric current control circuits is formed of a bistable circuit.

6. A method of driving a physical quantity distribution sensor which comprises (i) sensor/storage sections each of which is disposed in each of a plurality of unit cells and each of which is for sensing and storing information of a physical quantity, and (ii) buffers each for detecting and supplying the information stored in the sensor/storage section in a selected row, and in which at least one selection signal transfer line of a row selector for selecting a portion of said plurality of unit cells, is electrically connected to power supply input portions of said buffers,
- wherein the selection signal transfer line in the nth row to be read out being connected to input portion of reset elements in the (n−1) row.

7. A method of driving a physical quantity distribution sensor which comprises (i) sensor/storage sections each of which is disposed in each of a plurality of unit cells and each of which is for sensing and storing information of a physical quantity, and (ii) buffers each for detecting and supplying the information stored in the sensor/storage section in a selected row, and in which a first input portion of an electric current control means of the buffer in the mth column is connected to a column selector at its output portion for the (m−a)th column (a≧1), and in which a second input portion of said electric current control means of said buffer in said mth column is connected to said column selector at its output portion for the (m+b)th column (b≧1),
- wherein an electric current in said buffer in said mth column rises at the time when the (m−a)th column is selected, and falls at the time when the (m+b)th column is selected.

* * * * *